(12) United States Patent
Grinderslev (10) Patent No.: US 8,734,028 B2
(45) Date of Patent: May 27, 2014

(54) TOOL-LESS CLAMPING MECHANISM

(75) Inventor: Soren Grinderslev, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 265 days.

(21) Appl. No.: 13/115,615

(22) Filed: May 25, 2011

(65) Prior Publication Data

US 2012/0301086 A1    Nov. 29, 2012

(51) Int. Cl.
*G02B 6/36* (2006.01)
*G02B 6/38* (2006.01)

(52) U.S. Cl.
USPC ............... 385/81; 385/53; 385/60; 385/62; 385/76; 385/78

(58) Field of Classification Search
USPC ........................................... 385/62, 81
See application file for complete search history.

(56) References Cited

U.S. PATENT DOCUMENTS

| | | | |
|---|---|---|---|
| 4,923,274 A * | 5/1990 | Dean ........................ 385/72 |
| 5,088,804 A | 2/1992 | Grinderslev | |
| 5,208,887 A | 5/1993 | Grinderslev | |
| 5,812,718 A | 9/1998 | Carpenter et al. | |
| 6,179,482 B1 | 1/2001 | Takizawa et al. | |
| 6,379,054 B2 * | 4/2002 | Throckmorton et al. ....... 385/66 |
| 6,783,280 B2 | 8/2004 | Viklund | |
| 7,104,702 B2 | 9/2006 | Barnes et al. | |
| 7,178,990 B2 * | 2/2007 | Caveney et al. ............... 385/87 |
| 7,241,056 B1 * | 7/2007 | Kuffel et al. ................... 385/60 |
| 7,331,719 B2 | 2/2008 | Manning et al. | |
| 7,369,738 B2 | 5/2008 | Larson et al. | |
| 7,556,438 B2 | 7/2009 | Oike et al. | |
| 7,568,845 B2 * | 8/2009 | Caveney et al. ............... 385/87 |
| 7,572,064 B2 | 8/2009 | deJong | |
| 7,637,673 B2 | 12/2009 | Oike et al. | |
| 7,654,748 B2 * | 2/2010 | Kuffel et al. ................... 385/60 |

(Continued)

FOREIGN PATENT DOCUMENTS

| | | |
|---|---|---|
| JP | 8234040 A | 9/1996 |
| KR | 100944702 | 6/2009 |
| WO | 2009148797 | 12/2009 |

OTHER PUBLICATIONS

International Search Report, International Application No. PCT/US2012/039027/International Filing Date Mar. 23, 2012.

*Primary Examiner* — Rhonda Peace
(74) *Attorney, Agent, or Firm* — Merchant & Gould P.C.

(57) ABSTRACT

A clamping mechanism having a top and bottom orientation, comprising: (a) an inner component having a platform defining a fiber channel and a clamping member disposed over the fiber channel, the clamping component being connected to the inner component such that it moves radially independently from the rest of the inner component, the inner component defining a cavity above the clamping member to receive an actuator; (b) an outer casing containing the inner component, the outer casing defining a slot; and (c) an actuator comprising a rotating member disposed in the cavity and restrained therein from moving radially, the rotating member being configured to rotate along an axis parallel to the fiber channel, the rotating member configured to interact with the clamping member such that rotating the rotating member causes the clamping member to move toward the fiber channel such that any fiber disposed therein is clamped between the clamping component and the platform, the actuator also comprising a lever connected to the rotating member and protruding from the outer casing through the slot.

27 Claims, 6 Drawing Sheets

(56) References Cited

U.S. PATENT DOCUMENTS

| | | | |
|---|---|---|---|
| 7,722,262 B2 * | 5/2010 | Caveney et al. | 385/78 |
| 7,806,600 B2 * | 10/2010 | Marrs et al. | 385/81 |
| 7,891,882 B2 * | 2/2011 | Kuffel et al. | 385/60 |
| 8,002,476 B2 * | 8/2011 | Caveney et al. | 385/87 |
| 8,256,971 B2 * | 9/2012 | Caveney et al. | 385/87 |
| 2005/0036744 A1 | 2/2005 | Caveney et al. | |
| 2005/0265666 A1 | 12/2005 | Johnson | |
| 2007/0217751 A1 * | 9/2007 | Doss et al. | 385/95 |
| 2009/0317037 A1 | 12/2009 | Milette et al. | |
| 2010/0046892 A1 | 2/2010 | Milette et al. | |
| 2011/0116749 A1 * | 5/2011 | Kuffel et al. | 385/81 |
| 2012/0301086 A1 * | 11/2012 | Grinderslev | 385/78 |

* cited by examiner

TOOL-LESS CLAMPING MECHANISM

FIELD OF INVENTION

This invention relates generally to a fiber clamping mechanism, and, more specifically, to a fiber clamping mechanism that is actuated without the use of tools.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect optical fiber to passive devices such as switches and attenuators. The principal function of an optical fiber connector is to optically couple a fiber with a mating device (e.g., another fiber, an active device or a passive device) by holding the end of the fiber such that the core of the fiber is axially aligned with an optical pathway of the mating device.

To effect optical coupling and minimize Fresnel loss, the end of the fiber is commonly presented for mating in a polished ferrule. A polished ferrule assembly is most readily prepared in a controlled setting wherein precision equipment and skilled personnel are available for cleaving the fiber, terminating it in the ferrule, and then polishing the ferrule and fiber to exacting tolerances. However, often fibers must be terminated to connectors in the field where such facilities and personnel are not available.

Under these conditions, it is desirable to omit the step of the polishing the ferrule/fiber in the field by instead terminating the fiber in a connector which has a fiber stub already terminated and polished in a ferrule. The terminating fiber is optically coupled to the fiber stub in the connector, often with the use of a refractive index matched gel to improve optical coupling therebetween. The terminating fiber is held in intimate contact with the fiber stub by virtue of a clamping mechanism, which applies a radial force to the terminating fiber to secure it to the connector. Advantageously, this clamping mechanism facilitates straightforward field assembly by obviating the need to lever epoxy and for curing ovens during field termination. Field-installable connectors that have a clamping mechanism are referred to herein as "crimp-type" connectors. (See, for example, U.S. Pat. No. 7,331,719, incorporated herein by reference.)

Although such field installable connectors have been commercial successful, Applicant has identified a number of potential shortcoming. First, a traditional crimp-type connector requires a crimping tool to actuate it. The tool resembles a pair of pliers, each arm of the pliers having a specially-configured die attached thereto. One die receives the front of the connector, while the other die receives a plunger on the back of the connector. When the user squeezes the pliers shut, the plunger is pushed forward to actuate the clamping mechanism. Aside from requiring a tool, this termination approach also tends to be cumbersome as the user must hold the fiber and connector is a precise position, while using the tool. The cumbersome nature of this procedure may lead to error in the fiber's termination and decreased optical performance, not to mention the cost associated with acquiring the tools or replacement after a loss.

Complicating this problem is the fact that traditional field installable connectors are not reusable. Once the clamping mechanism is actuated, it cannot be reversed. Consequently, if the optical performance is not acceptable after the fiber is terminated, the connector must be cut off and scrapped.

Therefore, Applicant has identified a need for a field-installable connector that does not require a tool to be actuated, and that can be reversed after actuation. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a clamping mechanism that requires no tools to actuate and can be reversed and reused after actuation. Specifically, the clamping mechanism includes an actuation lever that enables the clamping mechanism to be transformed from an unactuated state to an actuated state, and back again, if necessary. In one embodiment, the lever extends from the mechanism sufficiently in the unactuated state to be readily accessible, but is tucked away after actuation so as not to be obstructive.

Accordingly, one aspect of the invention is a clamping mechanism comprising a lever capable of reversibly switching the clamping mechanism between actuated and unactuated states. In one embodiment, the clamping mechanism comprises: (a) an inner component having a platform defining a fiber channel and a clamping member disposed over the fiber channel, the clamping component being connected to the inner component such that it moves radially independently from the rest of the inner component, the inner component defining a cavity above the clamping member to receive a rotating member; (b) an outer casing containing the inner component, the outer casing defining a slot; and (c) an actuator comprising the rotating member disposed in the cavity and restrained therein from moving radially, the rotating member being configured to rotate along an axis parallel to the fiber channel, the rotating member configured to interact with the clamping member such that rotating the rotating member causes the clamping member to move toward the fiber channel such that any fiber disposed therein is clamped between the clamping component and the platform, the actuator also comprising a lever connected to the rotating member and protruding from the outer casing through the slot.

Another aspect of the invention is a connector comprising the clamping mechanism described above. In one embodiment, the connector comprises: (a) a clamping mechanism having an axis and a top and bottom orientation, comprising at least: (i) an inner component having a platform defining a fiber channel and a clamping member disposed over the fiber channel, the clamping component being connected to the inner component such that it moves radially independently from the rest of the inner component, the inner component defining a cavity above the clamping member to receive a rotating member; (ii) an outer casing containing the inner component, the outer casing defining a slot; and (iii) an actuator comprising the rotating member disposed in the cavity and restrained therein from moving radially, the rotating member being configured to rotate along an axis parallel to the fiber channel, the rotating member configured to interact with the clamping member such that rotating the rotating member causes the clamping member to move toward the fiber channel such that any fiber disposed therein is clamped between the clamping component and the platform, the actuator also comprising a lever connected to the rotating member and protruding from the outer casing through the slot; (b) a ferrule assembly comprising a ferrule and a ferrule holder disposed in the housing forward of the clamping mechanism; and (c) a housing containing the clamping mechanism and the ferrule assembly and having a second slot through which the lever extends.

Yet another aspect of the invention is a method of terminating a fiber and then testing the connection and re-terminating the fiber if necessary. In one embodiment, the method comprises: (a) cleaving and stripping a terminating fiber; (b) inserting the stripped fiber into the back of a connector and into a fiber channel of a clamping mechanism in the connector; (c) moving a lever of the clamping mechanism from an unactuated position to an actuated position thereby clamping the terminating fiber in the connector; (d) testing the connector; (e) if test results are below a desired level, moving the lever back to the unactuated position, removing the terminating fiber, and repeating steps (a)-(e) until desired level of performance is obtained.

DETAILED DESCRIPTION

Figures 1A, 1B:
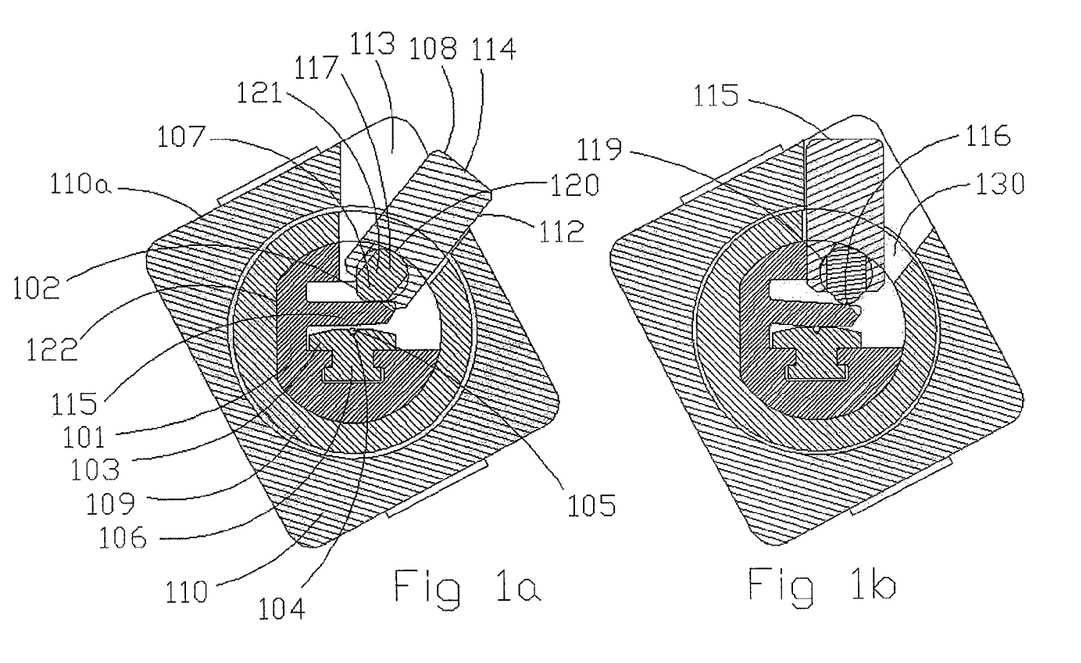
FIGS. 1(a) and 1(b) are schematics of the clamping mechanism of the present invention.

Referring to FIGS. 1(a) and 1(b), one embodiment of the clamping mechanism of the present invention is shown in its unactuated and actuated states, respectively. Throughout this description, the clamping mechanism and connector are described herein with respect to a top/bottom and front/back orientation. It should be understood that reference is made to this orientation for purposes of illustration and to describe the relative position of the components within a given connector. It should therefore be understood that this orientation is not an absolute orientation and that rotating, inverting or otherwise altering the connector's position in space is possible without changing the relative position of the components of the connector.

The clamping mechanism 100 comprises an inner component 101 having a platform 103 defining a fiber channel 104 and a clamping member 102 disposed over the fiber channel. The clamping component is connected to the inner component such that it moves radially independently from the rest of the inner component. The inner component also defines a cavity 117 above the clamping member to receive an actuator. The clamping mechanism 100 also comprises an outer casing 109 containing the inner component and defining a slot 130 (see FIG. 1b) Additionally, the clamping mechanism 100 comprises an actuator 107 comprising a rotating member 121 disposed in the cavity 117 and restrained therein from moving radially. The rotating member 121 is configured to rotate along an axis parallel to the fiber channel and to interact with the clamping member 102 such that rotation of the rotating member causes the clamping member to move toward the fiber channel such that any fiber 105 disposed therein is clamped between the clamping component 102 and the platform 103. An anti rotation longitudinal flat 122 is shown on FIG. 1(a) to prevent relative rotation when the lever is activated. In addition, a dimensional interference between the inner component and the outer casing 109. The actuator 107 also comprises a lever 108 connected to the rotating member 121 and protruding from the outer casing 109 through the slot 130. The clamping mechanism is illustrated in its unactuated state in FIG. 1(a) in which the lever 108 is in its unactuated position 114, and in its actuated state in FIG. 1(b) in which the lever is in its actuated position 115. The features of the clamping mechanism are described in greater detail below.

The function of the inner component 101 is to hold and secure one or more optical fibers 105. To this end, the inner component comprises a platform 103 defining at least one fiber channel 104 in which the fiber 105 is held. The fiber channel maybe a U-groove or V-groove or similar known structure. Additionally, for multi-fiber connectors, the fiber channel maybe a relatively wide channel, or a multiple set of discrete channels, suitable for holding multiple fibers. It is generally preferred, although not necessary, that the fiber channel be approximately in the center of the clamping mechanism such that the fiber is disposed essentially in the center of the connector or splice device in which the clamping mechanism is incorporated.

Another function of the platform 103 in one embodiment is to provide a platform for optically coupling a fiber stub and the terminating fiber. Specifically, the fiber stub and the terminating fiber preferably are butt jointed at an optical coupling in fiber channel 104. It should be obvious that the location of optical coupling can be anywhere along the fiber channel, although it may be preferable (but not necessary) to increase the clamping length of the terminating fiber relative to the fiber stub because the fiber stub is epoxied to the ferrule and does not experience any pull force, while the terminating fiber might experience disturbances and forces applied thereto. For example, in the embodiment shown in FIG. 5, the terminating fiber occupies about ⅔ of the fiber channel to increase the clamping length.

In the embodiment shown in FIG. 1, the platform 103 is a discrete component, which is received in a cavity 106 defined in the inner component 101. Configuring the platform 103 as a discrete component from the rest of the inner component 101 has a number of benefits. First, a discrete platform can be formed of a material selected to optimize the functionality of the platform, independent of the functional requirements of the other elements of the inner component (discussed below). For example, the platform may comprise a material that is somewhat compliant to allow some degree of impression by the fiber during actuation. That is, once the assembly is actuated and the fiber is pressed into the fiber channel, it is preferred that the material defining the channel deforms slightly around the fiber to increase the surface area contact with the fiber and thereby hold it more securely. Although a compliant material has benefits, it is within the scope of the present invention that other, harder materials may be used depending upon the application. For example, in certain situations, it may be preferable to use a silicon-based material with one or more fiber channel(s) etched into it. Although silicon tends to be hard and noncompliant, it is capable of being etched with extreme precision. The benefits of this precise etching may outweigh the drawbacks of the silicon's hardness. Conversely, the inner component 101 generally, although not necessarily, needs to be somewhat flexible to allow the clamping member 102 to move independently from the rest of the inner component 101 (discussed in detail below). Therefore, having a discrete platform facilitates these different functional requirements.

Having a discrete platform 103 also facilitates manufacturability. Specifically, a discrete platform 103 allows the fiber channel(s) 104 to be machined, etched, molded or otherwise defined therein without interference from other components of the inner component such as the clamping portion 102. This also improves the precision of the fiber channel(s) 104, which enhances fiber alignment and eases fiber termination as discussed below. Once the platform 103 is molded or otherwise defined with the fiber channel(s) 104, it can be inserted into the cavity 106 defined in the inner component 101 as shown in FIG. 1a. Another advantage of using discrete components is their ability to be separately molded out of polymers. This provides for inexpensive components all of which can be made out of polymers or composites.

Figure 3A:
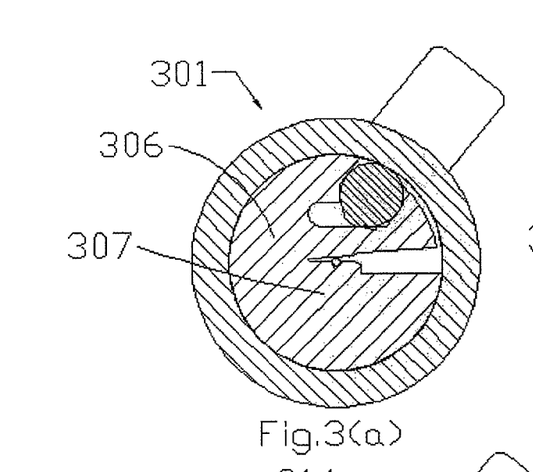
FIGS. 3(a)-(d) are alternative embodiments of the clamping mechanism of FIGS. 1(a) and (b).
Figure 3B:
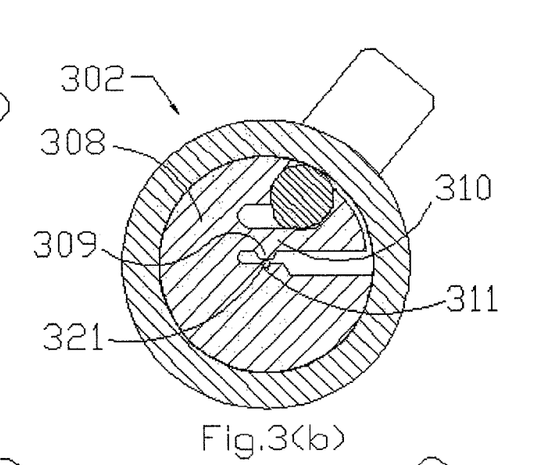
Figure 3C:
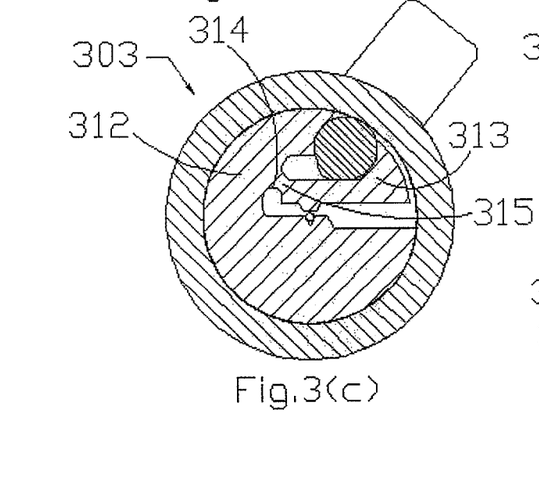

Although a discrete platform 103 has certain benefits, integrally molding the platform with the rest of the inner component 101, as shown in FIGS. 3(a), (b), and (c) (considered below), also has benefits. For example, such a configuration offers simplicity in the reduction of components of the connector. This is especially true if a manufacturing process is established in which the fiber channel(s) can be machined without interference from other components of the inner component 101. Furthermore, to the extent the platform 103 is integrally molded with a larger inner component 101, the larger mass will provide stability to the platform while still facilitating the clamping member.

The clamping member 102 is disposed directly above the platform 103. The clamping member functions to respond to the force of the actuator 107. As the actuator is rotated, the rotating member 121 forces the clamping member downward, urging the fiber 105 contained in the fiber channel(s) 104 against the platform 103, thereby securing the fibers to the clamping mechanism. Generally speaking, it is preferable to exploit the cantilever effect of the clamping member 102 by disposing the actuator 107 beyond the fiber channel 104. In other words, the amount of clamping force applied to the fiber 105 in fiber channel 104 will increase as the fiber channel is closer to the connection point 115 and the point at which the actuator 107 contacts the clamping member 103 moves outward.

The present invention contemplates a variety of embodiments of clamping member 102. In the embodiment pictured in FIG. 1a, the clamping member 102 is a relatively thin beam that extends outward relative to the body of the inner component 101. In this way, the clamping member 102 is essentially a cantilevered beam with a relatively narrow connection point 115 to the remainder of the inner component 101. This relatively narrow connection point 115 allows the clamping member 102 to move in response to the action of actuator 107.

Although the clamping member 102 is shown as an integrally-molded component of the inner component 101, it should be understood that other embodiments are possible within the scope of the invention. For example, the clamping member 102 maybe mechanically connected at point 115, rather than relying on the compliance of the inner component material. Such connections are known in the art, and include, for example, pivots, pin and hinge assemblies and other such mechanisms.

Referring to FIGS. 3a through 3d a variety of different inner component configurations are shown. In the clamping mechanism 301 shown in FIG. 3(a), the inner component 306 comprises an integrally-molded platform 307. In the clamping mechanism 302 of FIG. 3(b), the inner component 308 also comprises an integrally-molded clamping platform but also comprises a protrusion 309 on the clamping member 310, which functions to increase the clamping pressure applied to the fiber 311 in the fiber channel 321 when the compliant component 310 is urged downward on actuation.

Referring to FIG. 3(c), another embodiment of the clamping mechanism 303 is shown. In this embodiment, the inner component 312 comprises a clamping member 313 that has a particularly narrow connection point 315 as shown. Specifically, an additional notch 314 is taken to further narrow the connection point 315 thereby reducing the amount of force required to deflect the clamping member 313 during actuation.

Figure 3D:
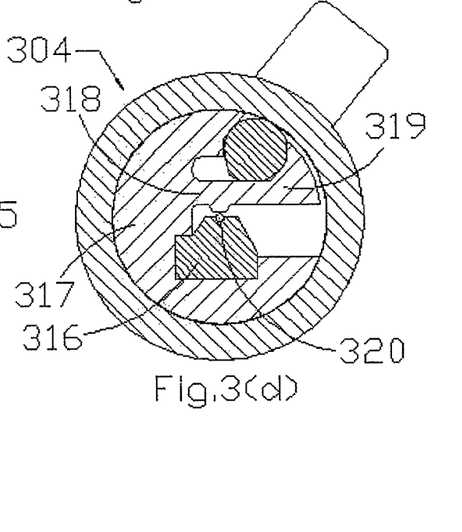

Referring to FIG. 3(d), another embodiment of the clamping mechanism 304 is shown. In this embodiment, a discrete clamping member 316 is shown in the inner component 317. The connection point 318 of the clamping member 319 is relatively close to the fiber channel 320. As mentioned above, having the fiber channel 320 relatively close to the connection point 318 is generally preferred from the standpoint that it exploits the lever action of the clamping member 319.

Figure 2:
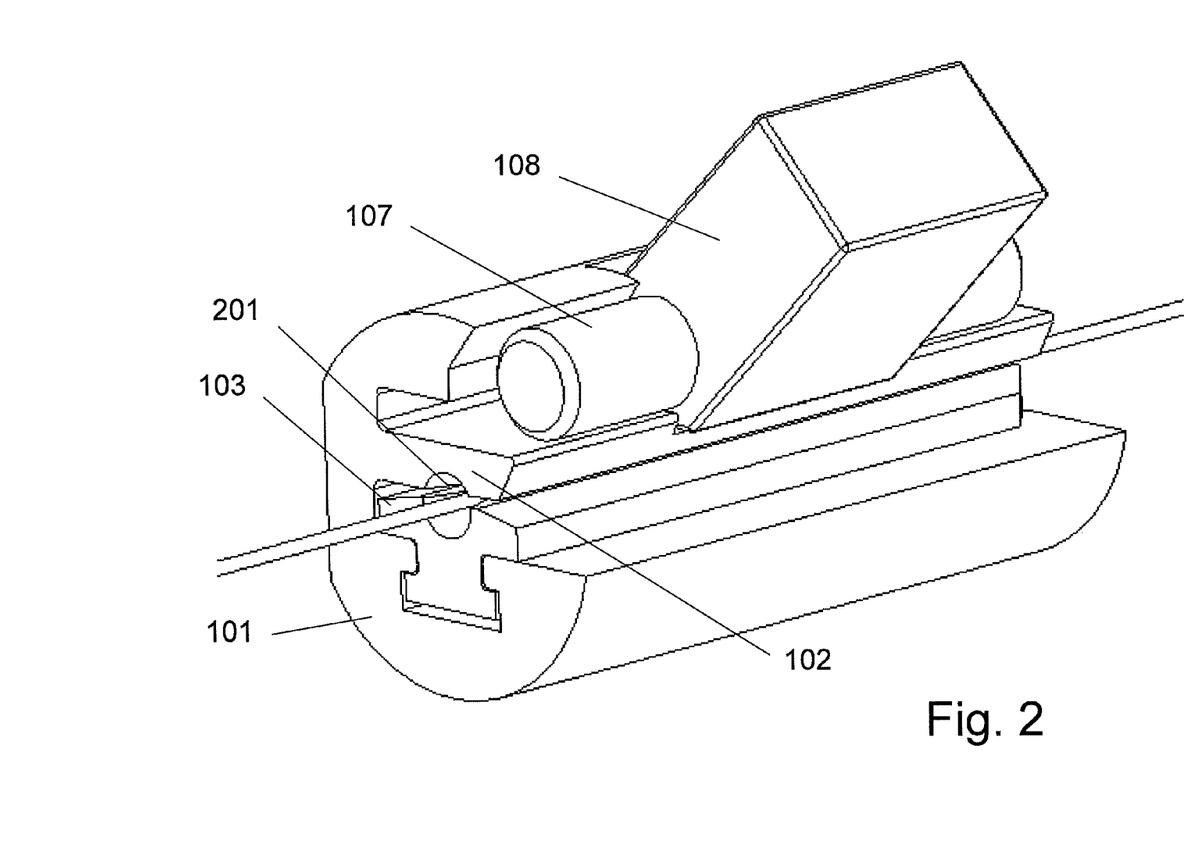
FIG. 2 is a perspective view of the clamping mechanism of FIGS. 1(a) and (b).

In one embodiment, the inner component comprises lead-ins to facilitate the insertion of the terminating fiber and optionally the fiber stub into the fiber channel. Specifically, referring to FIG. 2, the embodiment of FIG. 1a is shown in perspective view. This embodiment comprises a lead-in portion 201 defined in the inner component 101 on the lower portion of the clamping member 102 and on the platform 103 as shown. In one embodiment of a clamping mechanism for a connector, the front of the fiber channel has a lead-in cavity to guide the fiber stub into the fiber channel, while the back of the fiber channel has a second lead-in cavity to guide the terminating fiber into the fiber channel (see FIG. 5). By guiding the fiber into the fiber channel, the chance of damaging either the fiber stub or the terminating fiber is reduced.

Referring to FIG. 1a, the function of actuator 107 is to move clamping member 102 downward towards the fiber channel 104 as described above. In one embodiment, the actuator comprises a rotating portion 121 and lever 108. In this embodiment, actuator 107 and clamping member function as a cam mechanism to translate the rotation force of actuator 107 to a linear force. To this end, the rotating portion 121 has a first surface 111 which cooperates with a second surface 112 of the clamping member 102 such that when the actuator 107 is rotated by moving the lever 108, the first and second surfaces cooperate to push the clamping member 102 downward. In one embodiment, the first surface 111 is an eccentric surface as shown. Rotation of this eccentric surface against the second surface 112 creates a cam force, and, because the actuator 107 is prevented from moving radially, the only relief is for the clamping member 102 to move downward.

Although a cam surface is shown in the embodiments of FIGS. 1-4, it should be understood that the invention is not limited to a cam, but can also involve other mechanical linkages that translate rotational movement of the rotating member 121 into linear movement of the clamping member 102. For example, there may be a pin and rod assembly in which the pin is disposed near the perimeter of the rotating member 121 and a rod connects the pin to the clamping member, such that any rotation of the actuator results in a pistoning of the rod, thereby causing the clamping member to move downward. Alternatively, the camming action of the actuator may be eliminated entirely and a lever action used instead. For example, the rotating member may be eliminated and the lever extended such that one of its ends contacts the clamping member and its middle portion is connected to a fulcrum, such that movement of the lever's distal end (radially extending from the clamping mechanism), causes a downward movement of the opposite end, adjacent the clamping member, thereby resulting in downward deflection of the clamping member. Still other actuator embodiments may be used within the scope of the present invention.

Figure 7:
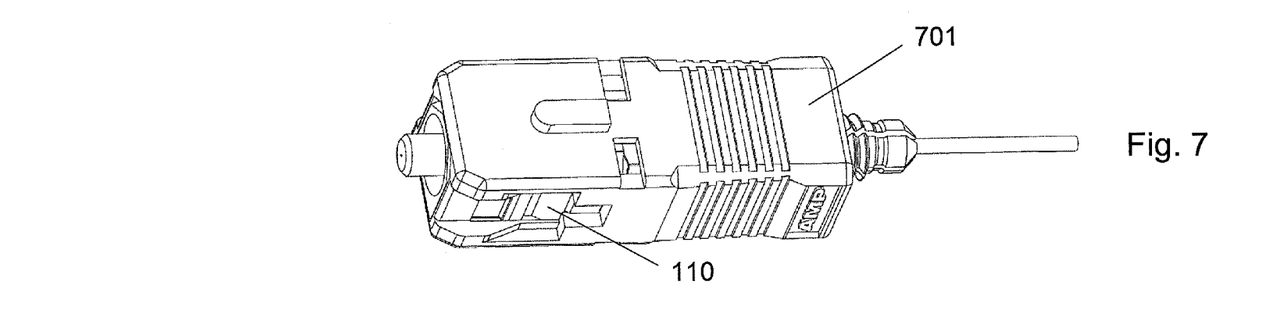
FIG. 7 shows the outer housing on the connector shown in FIG. 5.

Once in the actuated state as shown in FIG. 1b, it is desirable that the actuator 107 remains in that state, and does not revert back to the unactuated state shown in FIG. 1a. To this end, various mechanisms may be used. For example, as shown in FIGS. 1(a) and 1(b), the actuator 107, which, in this embodiment, has an eccentric first surface 111, can be "over rotated" in the actuated state such that the actuator is rotated past the apex 116 of the eccentric first surface 111, such that returning the actuator to the unactuated stated requires forcing the actuator up and over the other side of the apex 116. Furthermore, once the lever 108 is in the actuated position, an outer housing 701 may be slid over the clamping mechanism to prevent the lever from returning to the unactuated position as discussed in greater detail below.

Figures 4A, 4B, 4C:
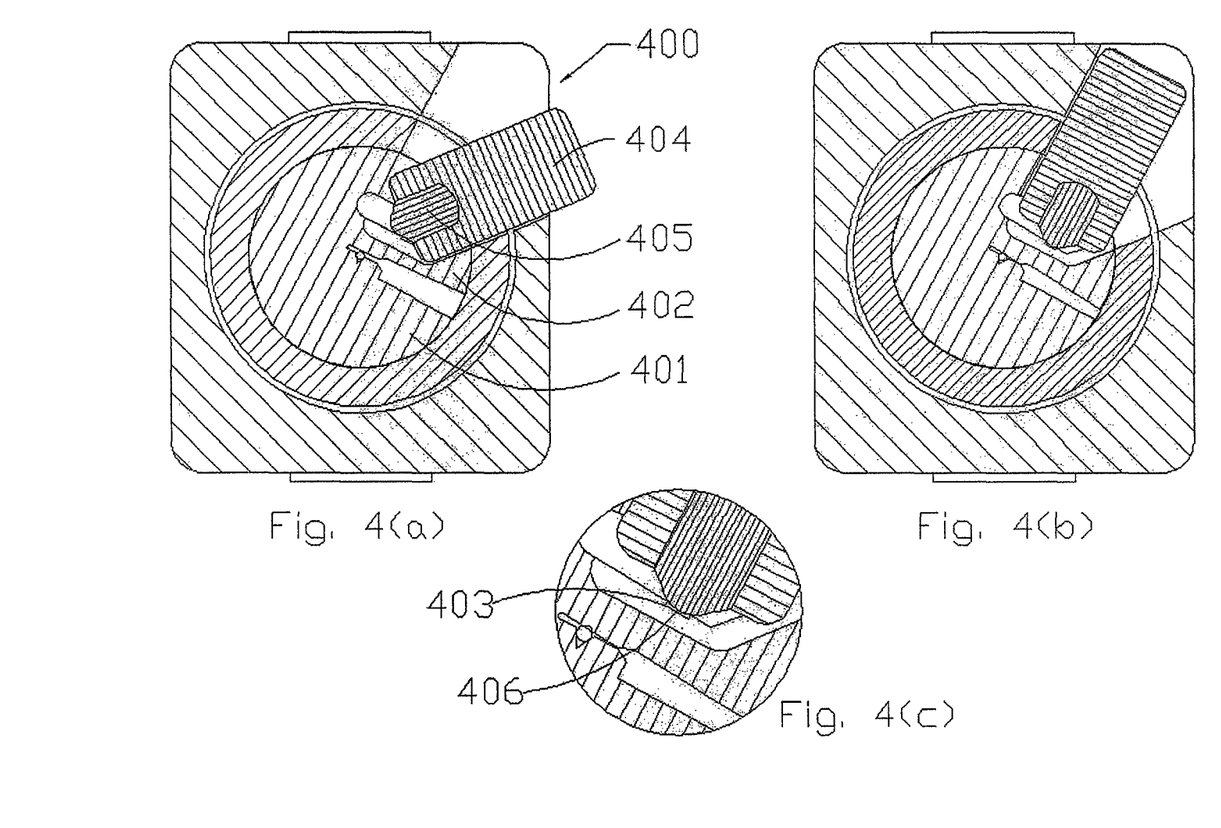
FIG. 4(a)-(c) show another alternative embodiment of the clamping mechanism of FIG. 1 having a locking feature.

Although having the actuator move past the apex 116 is one way to maintain the clamping mechanism in the actuated state, other approaches exist. For example, referring to FIGS. 4(a) through 4(c), a variation of the clamping mechanism is shown in which the inner component 401 comprises a clamping member 402, which has a recess 403 defined on its top surface as shown in detail in FIG. 4c. When the lever 404 is moved to rotate the actuator 405 from the unactuated position as shown in FIG. 4a to the actuated state as shown in FIG. 4b, the apex 406 of the actuator 405 is received in the recess 403. This configuration allows the actuator to click in place such that further rotation either way of the actuator 405 is made difficult. Still other means of locking the clamping mechanism in the actuated state will be obvious to those of skill in the art in light of this disclosure.

Referring back to FIGS. 1a and 1b, the outer casing 109 will now be described. The function of outer casing 109 is to cooperate with the inner component 101 to prevent the radial movement of the actuator 107. To this end, the outer casing 109, in one embodiment, is configured to receive the inner component 101 and cooperate with the inner component 101 to define a cavity 117 configured to receive the actuator 107 as shown in FIG. 1a. The cavity 117 is configured such that radial movement of the actuator 107 is prevented. In one embodiment, the outer casing 109 and inner component 102 contact the actuator 107 in at least three points. In the embodiment shown in FIG. 1a, one point 118 is on the clamping member 102, a second point 119 is on a portion of the inner component 101 above the clamping member 102, and a third point 120 is on the outer casing 109. The outer casing 109 also comprises a slot 130 as shown on FIG. 1(b) to accommodate the outward extending lever 108. The slot 130 allows the lever 108 to move from its unactuated position 114 of FIG. 1(a) to its actuated position 115 of FIG. 1(b).

In the embodiment of FIGS. 1(a) and 1(b), the outer casing 109 is a discrete component from the inner component 101. There are a number of advantages to having the outer casing discrete from the inner component. For example, such a configuration facilitates manufacturability in that the relatively intricate inner component 101 (especially if it comprises an intricately molded platform 307 as shown in FIG. 3a). By having the outer casing discrete, access to the various cavities of the inner component, such as the platform cavity 106 and the actuator cavity 117, is unencumbered.

Although a discrete outer casing is shown in FIGS. 1a and 1b, it should be understood that the invention is not limited to discrete components in that the inner component 102 and the outer casing 109 may be integrally molded. Additionally, it should also be appreciated that the outer casing 109 may be integrated into other components of a connector or splice. For example, referring to FIG. 5, the outer casing 109 of the clamping assembly is integrated with the ferrule holder 502 of the connector 500. Therefore, a decision on whether to integrate the outer casing with a component of the connector or splice or with the inner component 101 will be a function of the application of the device.

In embodiment of FIGS. 1(a) and (b), the clamping mechanism also comprises a housing 110 for containing the clamping mechanism. Like the outer casing 109, the housing 110 comprises a slot 113 to accommodate the lever 108. It should be appreciated that in the unactuated state, the lever 108 protrudes beyond the outer perimeter 110a of the housing 110 as shown in FIG. 1(a). In this state, the protruding lever is readily accessibly to the user for actuating the clamping mechanism. Additionally, because the lever 108 protrudes past the housing 110, it prevents the outer housing 701 (see FIG. 7) from being inserted thereover. This feature prevents the possibility of erroneously being able to mount the outer housing with the fibers unclamped.

Once actuated, the lever 108 is within the perimeter 110a of the housing 110 as shown in FIG. 1(b). This configuration allows an outer housing 701 to be slid over the housing 110 as shown in FIG. 7. Once the outer housing 701 is disposed over the housing 110, the outer housing 701 prevents the lever 108 from returning to its unactuated position 114.

It should be understood that the different features of the different inner components and the other alternative embodiments of the clamping mechanism disclosed in this specification may be mixed and matched among each other depending on the application. For example, protrusion 309 shown in FIG. 3b could be used in the clamping mechanism shown in FIG. 1a. Likewise, the enhanced connection point 315 shown in FIG. 3c could also be used in the embodiment of FIG. 1a.

As mentioned above, the clamping mechanism of the present invention can be used in a variety of applications, including, for example, field-installable connectors and field-installable splices. Referring to FIG. 5, a cross section of one embodiment of a field installable connector 500 is shown. Although an SC-type connector embodiment of the present invention is shown, it should be understood that the present invention is not limited to an SC-type connectors and may be practiced in any conventional or later-developed connector, including, for example, traditional ST and FC-type connectors, small form factor designs, such as, MU and LC connectors, and multi-fiber connectors such as the MTRJ, MPX, and MPO-type connectors. Furthermore, the clamping assembly of the present invention is not limited to connector applications and may be used in any optical application requiring a fiber to be secured to a structure. For example, the clamping assembly may be used as a splicing device to optically couple two fibers, or it may be incorporated into an active device, such as a transceiver, or a passive device, such as a multiplexer, to optically couple a fiber to the device. For purposes of simplicity, however, the description herein will focus mainly on the clamping assembly as used in a connector.

Figure 5A:
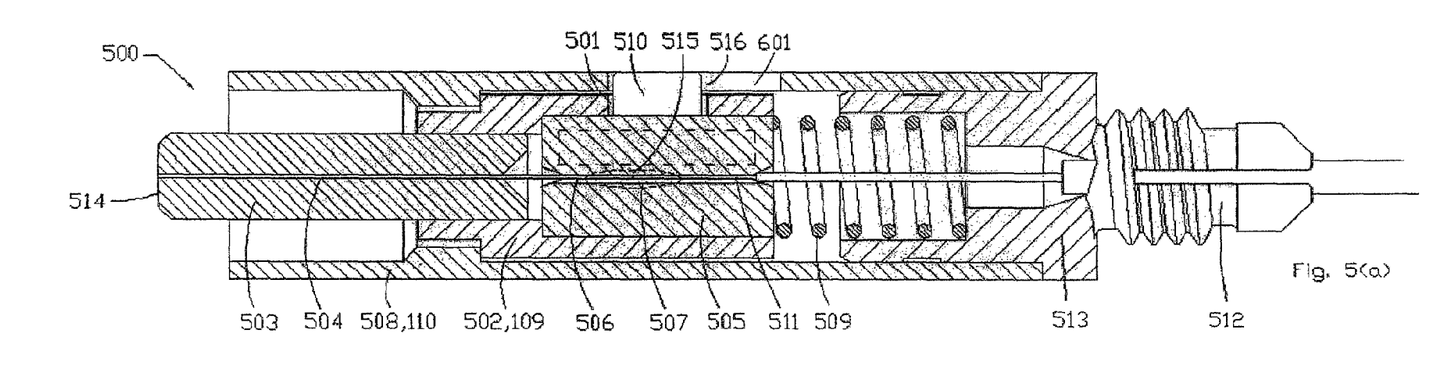
FIG. 5(a)-(b) show a cross-section of two embodiments of connectors of the present invention comprising the clamping mechanism of FIGS. 1(a) and (b).
Figure 5B:
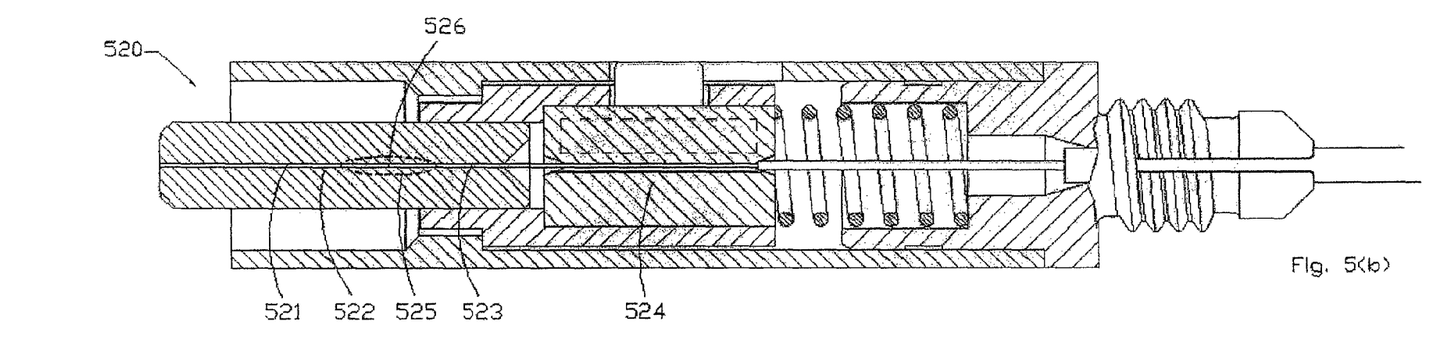

Referring to FIG. 5, one embodiment of a connector 500 using the clamping mechanism 505 is shown. In this embodiment, a fiber stub 504 is disposed in a ferrule 503 such that a polished end face of the fiber 504 is presented at the end face 514 of the ferrule. The fiber stub 504 is secured to the ferrule using a traditional adhesive such as epoxy. The fiber stub preferably is affixed and polished in the ferrule in a controlled environment where precise polishing equipment and skilled personnel are available. In the embodiment of FIG. 5(a), the fiber stub 504 is shown extending from the back of the ferrule for coupling with the terminating fiber in the fiber channel of the clamping mechanism. FIG. 5(b) shows another embodiment 520 in which a shorter fiber stub 521 is used which does not protrude from the back end of the ferrule. In such a configuration, the fiber stub optical couples to the terminating fiber 523 inside the ferrule channel 522 that extends forward from the clamping mechanism 524. In this embodiment, the clamping mechanism clamps only the terminating fiber over a substantial length equal to the length of the clamping mechanism. The alignment of the fibers is accomplished by the snug fit existing between the fibers and the ferrule channel. An index matching gel 525 can optionally be disposed within the ferrule channel at the optical coupling 526 between the fiber stub and the field fiber. In still another embodiment, no fiber stub is used, and the terminating fiber would be inserted through the ferrule. Furthermore, if the clamping mechanism of the present invention is used in a splicing application, a mating fiber, rather than a fiber stub, would meet the terminating fiber.

The ferrule 503 is held by ferrule holder 502 as shown in FIG. 5(a). As mentioned above, in this embodiment, the ferrule holder 502 also functions as the outer casing 109 (see FIG. 1(a)). The fiber stub 504 extends backward into the clamping mechanism 505 and is received in the fiber channel 506 as shown. From the opposite end of the connector 500 a terminating fiber 511 is inserted through the cable anchor and buffer clamp 512 and through the rear of the clamping mechanism 505 and into the same fiber channel 506 as the fiber stub 504 is disposed. In one embodiment, an index-match gel 507 is disposed at the optical coupling 515 between the fiber stub and the field fiber 511. In one embodiment, the index matching gel is factory-installed.

The clamping mechanism 505 is held within the ferrule holder 502 as shown. The ferrule, ferrule holder and clamping mechanism 505 are connected and move together as a unitary ferrule assembly. In this regard, a spring 509 is disposed behind the clamping mechanism 505 and is configured to urge the ferrule assembly forward as is generally known in the art. A rear body component 513 is secured to the plug body 508 and functions as a backstop for the spring 509. A slot 501 in the ferrule housing and a corresponding slot 516 in the plug body allow the lever 510 to protrude from the clamping mechanism 505 and to provide access to the lever 510 of the clamping mechanism 505.

Figure 6A:
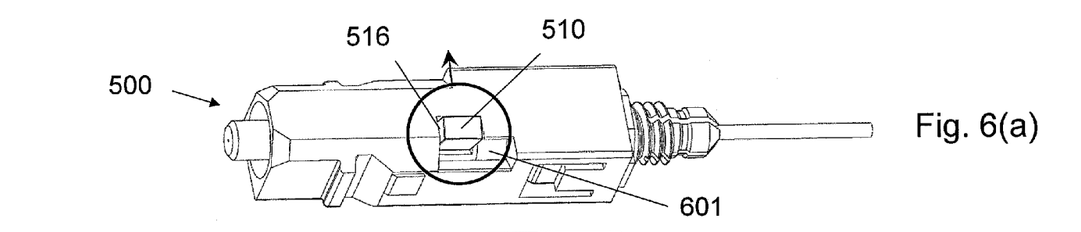
FIGS. 6(a)-(c) show a perspective view of the connector of FIG. 5 unactuated, actuated, and actuated with the ferrule assembly pushed back.
Figure 6B:
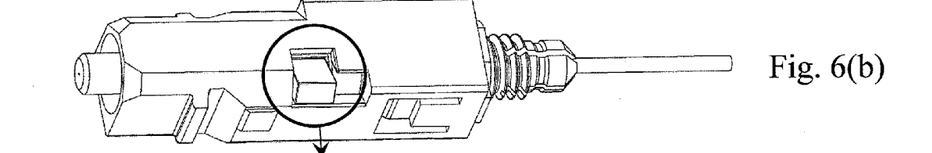
Figure 6C:
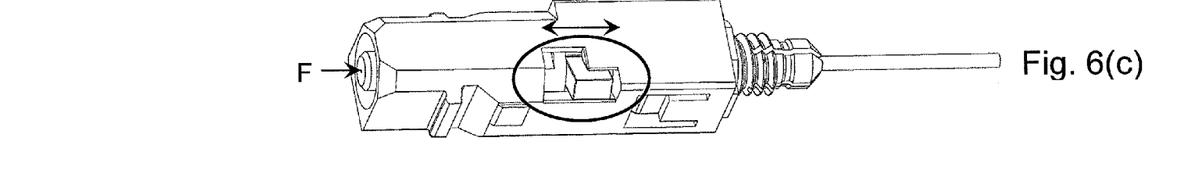

Referring to FIGS. 6(a) through 6(c), one embodiment of the connector 500 is shown having a slot 516 with a perpendicular portion 601. As mentioned above, the slot 516 allows the lever 510 to protrude and provides sufficient space for the lever to be switched form the unactuated state as shown in FIG. 6(a) to the actuated state is shown in FIG. 6b. The perpendicular portion 601 allows the ferrule assembly to move within the plug housing 508 by allowing the lever 510 to be received in the perpendicular portion 601 as shown in FIG. 6c. Accordingly, the perpendicular portion allows the ferrule assembly (which includes the clamping mechanism) unhindered travel when the ferrule assembly is being depressed (for example, during mating).

The assembly of the connector 500 is straightforward and can be performed in different ways. For example, the clamping mechanism can be assembled by first inserting the inner component 102 within the outer casing 109 and then inserting the rotating member 121 axially. Once the rotating member 121 is axially positioned, the lever 108 can be inserted through the slot and snapped onto the rotating member 121 to hold the actuator 107 in place. Alternatively, if the clamping mechanism of the present invention is used in the connector, for example, the connector 500 shown in FIG. 5a, the clamping mechanism 505 is inserted into the back of the fiber holder 508 and secured thereto through an interference fit. The rotating member 121 (FIG. 1(a)) is inserted axially from the rear of the clamping mechanism 505. The ferrule assembly is then inserted within the plug body 508. Finally, the lever 510 is then inserted through the slots 516 and 501 to snap onto the rotating member 12, thereby holding the actuator 107 in the clamping mechanism 105 as shown in FIG. 5. At this point, the assembled connector and outer housing are provided as a kit for field termination of the terminating fiber.

Terminating the fiber in the field involves first preparing the terminating fiber by removing the buffer from the bare fiber and cleaving the end to produce a smooth low loss facet to optically couple with another fiber. This is a well-known process. The terminating fiber may or may not have a jacket. In one embodiment, the terminating fiber comprises a 125 um glass fiber covered by a 250 um protective primary polymeric buffer. Over this coating is another polymeric buffer layer, typically 900 um in diameter. It is understood that the dimensions and the materials can vary. In another embodiment, the terminating fiber is a hard coated fiber in which the primary buffer is replaced by a hard coating. Examples of hard coatings are: hard polymer, silica, metal coatings.

In one embodiment, only the distal tip of the fiber is stripped down to bare fiber. More specifically, a length of terminating fiber is stripped down to the primary buffer to form a stripped portion and then just the distal end of the stripped portion is further stripped down to bare fiber. Such an approach offers several benefits. For example, clamping the stripped portion, rather than the bare portion, in the connector's clamping mechanism may offer better retention against axial pull on the terminating fiber. Furthermore, the primary buffer also serves to protect the bare fiber from environmental factors such as, for example, moisture. Therefore, limiting the length of the bare portion, limits the fiber's exposure to environmental factors. Yet another benefit of leaving the primary buffer intact is that, in one embodiment, the primary buffered fiber is used to created a buckle/bend (mentioned below), which, after the outer buffer is clamped to the connector, provides a constant forward urging force on the fiber end to secure physical contact with the fiber stub at all times especially during environmental changes. In this respect, the stripped portion will provide a greater forward urging force than the bare fiber portion because it is stiffer.

Next, the stripped fiber is inserted in the back of the connector 500, with the outer housing 701 removed. In one embodiment, the bare fiber is pushed along the fiber channel until it contacts the back end face of the fiber stub at an optical coupling 115 between the front and back ends of the fiber channel 506. Alternatively, in embodiments in which the optical coupling with the fiber stub occurs in the ferrule, the fiber is pushed through the entire length of the fiber channel and into the ferrule. In embodiments in which there is no fiber stub used at all, the fiber is pushed through the ferrule to the ferrule end face wherein the end of the fiber is positioned to be flush with the end face 514 of the ferrule.

Next, it is generally preferred that a force be applied to the terminating fiber 511 to create a slight bow or buckle in the terminating fiber. This provides a forward urging force to ensure physical contact between the terminating fiber and the fiber stub at all times, especially during temperature extremes in which there is a tendency for the fibers to separate due to differences in the coefficients of thermal expansions of the materials.

The lever 510 is then moved from the unactuated state to the actuated state, thereby causing the clamping member to push the fiber into the fiber channel and secure the terminating fiber to the connector. As mentioned above, in one embodiment, the stripped portion of the fiber is clamped into the fiber channel. Such an approach may offer enhanced clamping force compared to the clamping the bare portion of the fiber to the fiber channel. In other embodiments, it may be beneficial to clamp the un-stripped fiber (i.e., the fiber with the outer buffer intact) to the fiber channel.

Next, the optical performance of the connector 500 is tested to ensure the optical coupling 115 is sufficient. If the connector passes testing, the strength member may be secured to the connector using known approaches or the tool-less approach disclosed in U.S. application Ser. No. 13/115,652 (incorporated by reference). The outer housing 701 may then be slipped over the plug body 508 to ensure that the actuator remains in the actuated state as described above.

If the desired optical performance is not achieved, the above-mentioned assembly process is essentially reversed and a new termination re-attempted. Specifically, the outer housing is removed (if it was installed), lever 510 is moved from the actuated position to the unactuated position, and the terminating fiber 511 is pulled from the back of the connector 500. At this point, it is generally preferred that the terminating fiber be re-cleaved and stripped to provide a fresh terminating end.

At this point, the above-mentioned process is repeated until the desired optical performance of the optical coupling 515 is achieved. Although performance may vary, in one embodiment, the connector 500 is configured such that at least five termination attempts are possible. Once the desired optical performance is achieved, the outer housing is mounted as mentioned above.

Therefore, the reversible feature allows the installer to release the mechanical splice for re-termination if the optical performance provides proof to be non-satisfactory. Instead of having to cut off a poor-performing connector, the mechanical fiber splice can be released allowing the fiber to be removed. The fiber can then be re-cleaved and reinserted into the connector and retested. This reduces the termination time, saves connector usage and costs and is made from fewer components than traditional connector designs. It should be apparent from the above description that the clamping mechanism of the present invention provides for significant advantages over conventional field-installable configurations such as reversibility, lower cost and simplicity in manufacturing.

What is claimed is:

1. A clamping mechanism having a top and bottom orientation, comprising:
    an inner component having a platform defining a fiber channel and a clamping member disposed over said fiber channel, said clamping member being connected to said inner component such that said clamping member moves radially independently from the rest of said inner component, said inner component defining a cavity above said clamping member to receive a rotating member;
    an outer casing containing said inner component, said outer casing defining a slot; and
    an actuator comprising said rotating member disposed in said cavity and restrained therein from moving radially, said rotating member being configured to rotate along an axis parallel to said fiber channel, said rotating member configured to interact with said clamping member such that rotating said rotating member causes said clamping member to move toward said fiber channel such that any fiber disposed therein is clamped between said clamping member and said platform, said actuator also comprising a lever connected to said rotating member and protruding from said outer casing through said slot.

2. The clamping mechanism of claim 1, wherein said clamping member is compliantly connected to said inner component.

3. The clamping mechanism of claim 1, wherein said platform is discrete and wherein said inner component defines a second cavity for receiving said platform.

4. The clamping mechanism of claim 1, wherein said platform and said inner component are integrally molded.

5. The clamping mechanism of claim 1, wherein said rotating member is eccentric and contacts said clamping member such that rotating said rotating member results in a camming action with said clamping member.

6. The clamping mechanism of claim 5, wherein said rotating member has an apex, wherein actuating said clamping mechanism comprises rotating said rotating member such that said contact with said clamping member moves past said apex.

7. The clamping mechanism of claim 5, wherein said rotating member has an apex and wherein said clamping member comprises a first surface comprising a recess configured to receive said apex such that a nonlinear increase in force is required to rotate said rotating member once said apex is received in said recess.

8. The clamping mechanism of claim 1, wherein said outer casing and said inner component are discrete components.

9. The clamping mechanism of claim 1, wherein said clamping member comprises a protrusion over said fiber channel thereby causing the force translated to said clamping member by said actuator to be concentrated at said protrusion.

10. The clamping mechanism of claim 1, further comprising: a housing having a perimeter and a second slot, said lever extending through said second slot and beyond said perimeter when in an unactuated state, said lever extending through said second slot but not beyond said perimeter when in an actuated state.

11. The clamping mechanism of claim 10, wherein said second slot comprises a perpendicular portion that facilitates the axial movement of said lever within said housing.

12. The clamping mechanism of claim 10, further comprising: an outer housing disposed over said housing when in an actuated state, said outer housing preventing said lever from returning to an unactuated state.

13. A connector comprising the clamping mechanism of claim 12.

14. A connector comprising:
    a clamping mechanism having an axis and a top and bottom orientation, comprising at least:
        an inner component having a platform defining a fiber channel and a clamping member disposed over said fiber channel, said clamping member being connected to said inner component such that said clamping member moves radially independently from the rest of said inner component, said inner component defining a cavity above said clamping member to receive a rotating member;
        an outer casing containing said inner component, said outer casing defining a slot; and
        an actuator comprising said rotating member disposed in said cavity and restrained therein from moving radially, said rotating member being configured to rotate along an axis parallel to said fiber channel, said rotating member configured to interact with said clamping member such that rotating said rotating member causes said clamping member to move toward said fiber channel such that any fiber disposed therein is clamped between said clamping member and said platform, said actuator also comprising a lever connected to said rotating member and protruding from said outer casing through said slot;

a ferrule assembly comprising a ferrule and a ferrule holder; and a housing containing said clamping mechanism and said ferrule assembly and having a second slot through which said lever extends, wherein said ferrule assembly is disposed in said housing forward of said clamping mechanism.

15. The connector of claim 14, further comprising: a spring disposed within said housing and behind said ferrule assembly and said clamping mechanism to bias said ferrule assembly and said clamping mechanism forward in said housing.

16. The connector of claim 14, wherein said ferrule holder is integral with said outer casing.

17. The connector of claim 14, wherein said ferrule assembly further comprises a fiber stub secured to said ferrule and having one end disposed at an end face of said ferrule.

18. The connector of claim 17, wherein said fiber stub has another end disposed in said fiber channel.

19. The connector of claim 18, wherein further comprising an optical gel disposed in said fiber channel at said end of said fiber stub.

20. The connector of claim 17, wherein said fiber stub has another end disposed only part way through a ferrule channel.

21. The connector of claim 20, wherein further comprising an optical gel disposed in said ferrule channel at said end of said fiber stub within the ferrule channel.

22. The connector of claim 14, wherein said second slot of said housing comprises a perpendicular portion to receive said lever when in said actuated state to allow said ferrule assembly to move relative to said outer housing.

23. The connector of claim 14, wherein in an unactuated state, said lever extends beyond the perimeter of said housing and in an actuated state said lever does not extend beyond the perimeter of the housing, and further comprising: an outer housing disposed over said housing when in said actuated state and preventing said lever from returning to said unactuated state.

24. A method of terminating a fiber comprising:
(a) cleaving and stripping a terminating fiber to form a bare portion;
(b) inserting said bare portion into a back of a connector, and pushing said bare portion forward in a fiber channel of a clamping mechanism until said bare portion contacts a fiber stub, wherein said clamping mechanism includes an actuator comprising a rotating member disposed in a cavity above a clamping member and restrained therein from moving radially, said actuator also comprising a lever connected to said rotating member;
(c) moving said lever of said clamping mechanism from an unactuated position to an actuated position thereby causing a first surface of the rotating member to cooperate with a second surface of the clamping member to clamp said terminating fiber in said connector;
(d) testing said connector;
(e) if test results are below a desired level, moving said lever back to said unactuated position, removing said terminating fiber, and repeating steps (a)-(e) until desired level of performance is obtained.

25. The method of claim 24, wherein step (b) comprises inserting said bare portion into the back of a connector, through said fiber channel, and into a ferrule channel to make contact with said fiber stub.

26. The method of claim 25, wherein said terminating fiber comprises a glass fiber covered by a primary polymeric coating, which is covered by an outer polymeric buffer; wherein step (a) comprises stripping said terminating fiber to said primary polymeric coating to form a stripped portion, and then stripping the distal end of said stripped portion down to the glass fiber to form said bare portion; and step (b) comprises guiding said stripped portion into the ferrule channel such that said bare portion makes contact with the fiber stub; and step (c) comprises clamping said stripped portion.

27. The method of claim 25, wherein said terminating fiber comprises a glass fiber covered by a hard coating, which is covered by an outer polymer buffer, and step (a) comprises stripping said terminating fiber to said hard coating to form a stripped portion, and then stripping the distal end of said stripped portion down to the glass fiber to form said bare portion; step (b) comprises inserting said stripped fiber into the back of the connector and through the fiber channel of the clamping mechanism such that said bare portion makes contact with said stub; and step (c) comprises clamping said stripped portion in said connector.

\* \* \* \* \*